May 29, 1951 H. J. BUTLER 2,555,184
FLUID OPERATED BRAKING SYSTEM FOR AIRCRAFT
Filed Dec. 4, 1948 2 Sheets-Sheet 1
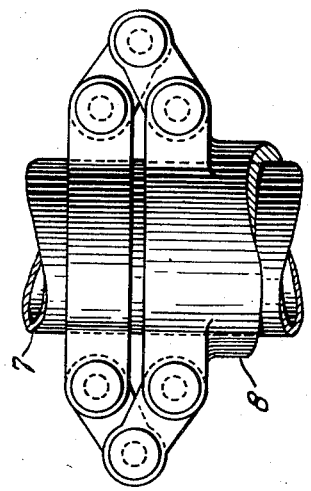
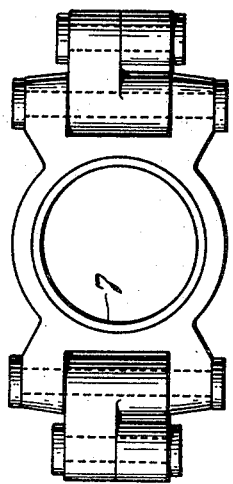
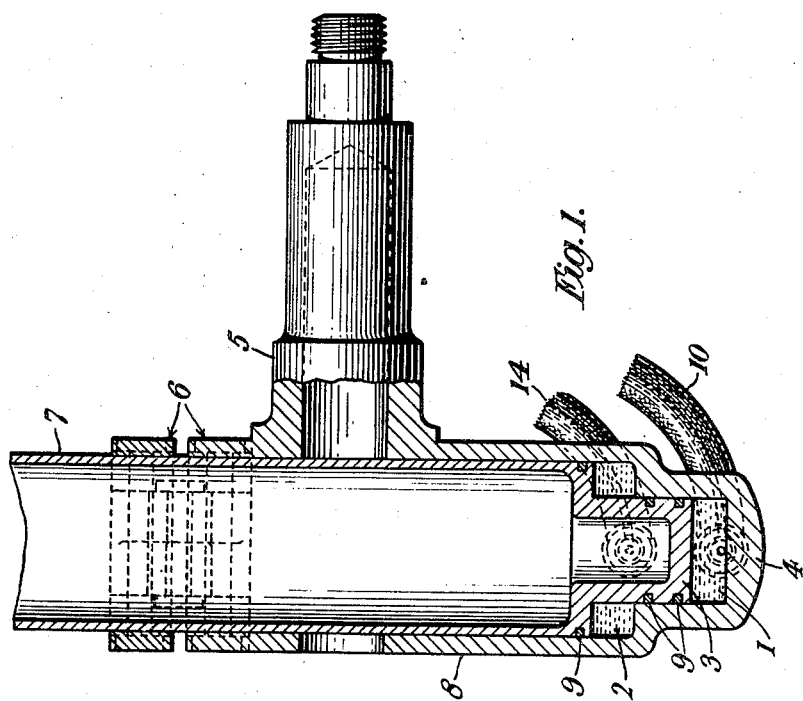
INVENTOR
Henry James Butler
by Benj. T. Rauber
his attorney May 29, 1951 H. J. BUTLER 2,555,184
FLUID OPERATED BRAKING SYSTEM FOR AIRCRAFT
Filed Dec. 4, 1948 2 Sheets-Sheet 2

INVENTOR.
HENRY JAMES BUTLER
BY
Benj. T. Rauber
HIS ATTORNEY

Patented May 29, 1951

2,555,184

UNITED STATES PATENT OFFICE 2,555,184

FLUID OPERATED BRAKING SYSTEM FOR AIRCRAFT

Henry James Butler, Sutton Coldfield, England, assignor to Dunlop Rubber Company Limited, London County, England, a British company Application December 4, 1948, Serial No. 63,559
In Great Britain December 18, 1947

4 Claims. (Cl. 244—111)

This invention relates to an improved fluid operated braking system for aircraft.

Aircraft brakes are usually operated from a source of fluid pressure which can be applied to the brakes when required through a valve which is under the control of the pilot.

In this system the braking pressure employed depends solely on the judgement of the pilot. If the pressure should be too little he can gradually increase it but if on landing he should apply too great a pressure, the tyres may become damaged through the locking of the wheels and a serious accident result. There is indeed a maximum pressure that should not be exceeded when it is desired to brake the aircraft in the shortest distance without damage to the tyres. This pressure is not constant but varies with the load on the aircraft, being greater as the load is increased.

It has been proposed to provide means actuated by the load on the aircraft wheels for automatically supplying pressure fluid to the wheel brakes and so operating them when the aircraft touches down. Such means, however, is purely automatic and the braking pressure applied is pre-determined in relation to the load on the wheel and cannot be modified by the pilot. However, though it is desirable to prevent a pilot from applying a braking pressure exceeding a maximum, which varies with the load on the wheel, it is also desirable that he should be able to reduce the pressure below this maximum if necessary.

It is the object of the present invention to provide a fluid pressure operated braking system for aircraft comprising means actuated by the load on the wheels for automatically supplying pressure fluid to the brakes wherein the braking pressure so produced can be varied by the pilot up to a pre-determined maximum.

According to the present invention a fluid pressure operated braking system for aircraft in which the wheels are mounted on oleo struts provided with means whereby increase of internal pressure in the legs provides a source of pressure for the automatic and independent application of the brakes comprises means for relieving the said internal pressure by the application of pressure from an independent source of fluid pressure.

According to the preferred construction an aircraft braking system comprises an oleo leg comprising a strut portion, a sleeve enclosing the extremity of the said strut portion having a stub axle adapted to carry a wheel, the said strut portion and sleeve being so formed as to provide a base space between the base of the strut portion and the base of the sleeve and an annular space between the sides of the strut portion and the sides of the sleeve, a pipe connection from one space to a fluid-operated brake mechanism on the said wheel, and a pipe connection between the other space and a source of fluid pressure supply under the control of the pilot.

The invention will now be more particularly described with reference to a braking system in which the two bodies of fluid are disposed in cavities formed between the base of an aircraft leg of circular cross-section and an enclosing sleeve integral with a stub axle on which the wheel is rotatably mounted. A suitable link connection is provided between the leg and the sleeve to allow relative axial movement but to prevent rotatory movement.

A suitable construction for such a leg is illustrated in the accompanying drawings wherein:

Figure 1 shows in diagrammatic form a cross-section of base of an aircraft leg, and Figures 2 and 3 show respectively diagrammatic views in elevation and plan of the link connection between the leg and the sleeve.

Figure 4:
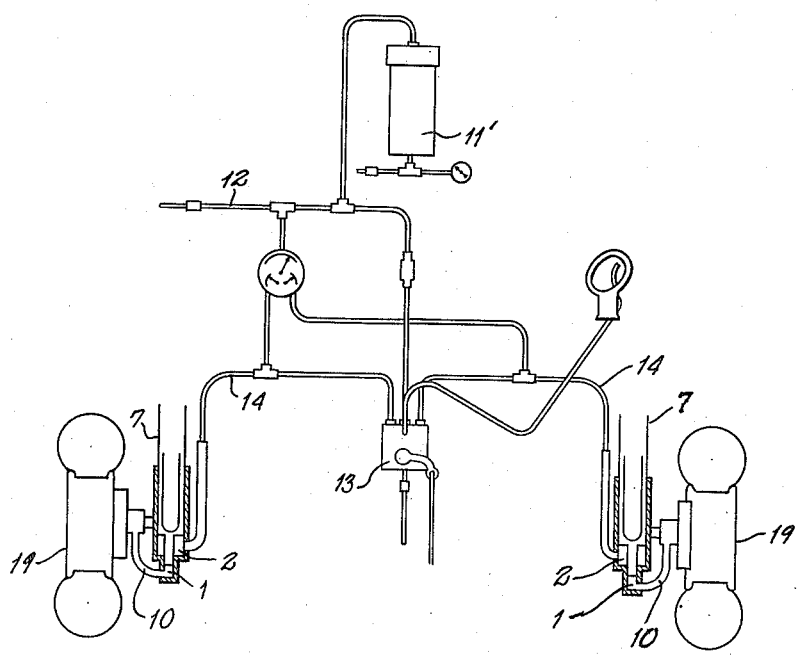
Fig. 4 is a diagrammatic sketch of a braking system incorporating the aircraft leg of the present invention.

Referring to the drawings, the device comprises an aircraft leg 7 slidably carried in an enclosing sleeve 8. The internal diameter of the lower end 4 of the sleeve is smaller than that of the main portion thereof and a similar reduced diameter portion 3 is formed on the lower end of the leg and is a sliding fit in the reduced diameter portion of the sleeve. Sealing rings 9 are provided in the reduced diameter portion of the leg and at the base of its larger diameter portion to seal the cylinder and annular chambers formed respectively by the reduced diameter portions of the leg and sleeve and by the radial and axial faces of the sleeve and leg at the junctions of the reduced and larger diameter portions thereof. The cylindrical chamber 1 contains a hydraulic fluid and has a pipe connection 10 with fluid-operated brake mechanism while the annular chamber 2 contains hydraulic fluid and has a pipe connection 14 with a source of fluid pressure under the control of the pilot.

Fig. 4 shows the system diagrammatically. The source of fluid pressure is either an accumulator 11' or a pump, compressor or the like which delivers pressure fluid through the line 12, to a differential control unit 13 under the control of a pilot which in turn transmits pressure fluid along the lines 14 to the two annular chambers 2 each adjacent the bottom of an aircraft leg 7. The cylindrical chamber 1 at the bottom of each leg communicates, through the line 10 with a brake associated with a wheel 19 secured to the bottom of the leg.

The link connection illustrated on Figures 2 and 3 is denoted by the reference 6 in Figure 1 while the reference 5 indicates a stub axle integral with the sleeve 8.

The operation of the system is as follows. When the aircraft is parked the brakes are applied by releasing the fluid pressure in the annular chamber so that the whole weight of the aircraft is carried by the fluid in the cylindrical chamber and is transmitted to the brake mechanism. When the pilot prepares to take-off the annular chamber is placed in communication with the source of fluid pressure and the pressure in the said chamber is thereby increased, which causes the leg to move axially upward and relieve the pressure in the cylindrical chamber, thus releasing the brakes.

On preparing to land the pilot can partially or wholly release the fluid pressure in the annular chamber but in any case the braking pressure applied will never exceed that due to the load on the wheels.

The construction is equally applicable to twin wheels if a stub axle is provided on each side of the sleeve.

Having described my invention what I claim is:

1. A fluid pressure operated aircraft braking system which comprises an oleo leg comprising a strut portion, a sleeve enclosing the extremity of the said strut portion having a stub axle adapted to carry a wheel, the said strut portion and sleeve being so formed as to provide a base space between the base of the strut portion and the base of the sleeve and an annular space between the sides of the strut portion and the sides of the sleeve, a pipe connection from one space to a fluid-operated brake mechanism on the said wheel, and a pipe connection between the other space and an independent source of fluid pressure supply.

2. A fluid pressure operated aircraft braking system which comprises a strut, a wheel carrying member slidable in an axial direction relative to said strut, an expansible fluid supply chamber having an outlet for connection to said braking system and compressed by pressure of said strut on said wheel carrying member to impart a proportionate pressure to fluid in said chamber, and an expansible control chamber between said strut and said wheel carrying member and having an inlet for pressure fluid to oppose and control the pressure of said strut on said wheel carrying member.

3. The apparatus of claim 2 in which said supply chamber and said control chamber each comprises a cylinder and a piston slidable in said cylinder.

4. The apparatus of claim 2 in which said supply chamber comprises a cylinder in said wheel carrying member slidably fitting a portion of said strut and in which said control chamber comprises a cylinder in said wheel carrying member co-axial with that of said supply chamber and slidably fitting said strut.

HENRY JAMES BUTLER.

REFERENCES CITED

The following references are of record in the file of this patent:

UNITED STATES PATENTS

| Number    | Name     | Date           |
|-----------|----------|----------------|
| 1,727,696 | Breguet  | Sept. 10, 1929 |
| 1,852,116 | Johnson  | Apr. 5, 1932   |
| 2,192,281 | Wallace  | Mar. 5, 1940   |
| 2,222,683 | Overbeke | Nov. 26, 1940  |
| 2,381,842 | Schwend  | Aug. 7, 1945   |